United States Patent
Jang

(10) Patent No.: US 11,823,833 B2
(45) Date of Patent: Nov. 21, 2023

(54) APPARATUS AND METHOD FOR IMPROVING EFFICIENCY OF DISTRIBUTED GENERATION FACILITY

(71) Applicant: SYNERGY INC., Ulsan (KR)

(72) Inventor: Kwun Young Jang, Suwon-si (KR)

(73) Assignee: SYNERGY INC., Ulsan (KR)

( * ) Notice: Subject to any disclaimer, the term of this patent is extended or adjusted under 35 U.S.C. 154(b) by 0 days.

(21) Appl. No.: 17/620,469

(22) PCT Filed: Jan. 20, 2021

(86) PCT No.: PCT/KR2021/000777
§ 371 (c)(1),
(2) Date: Dec. 17, 2021

(87) PCT Pub. No.: WO2021/221270
PCT Pub. Date: Nov. 4, 2021

(65) Prior Publication Data
US 2022/0246351 A1    Aug. 4, 2022

(30) Foreign Application Priority Data

Apr. 29, 2020    (KR) .......................... 10-2020-0052763

(51) Int. Cl.
*G05F 1/14*    (2006.01)
*H01F 29/04*   (2006.01)
*H02J 1/04*    (2006.01)

(52) U.S. Cl.
CPC .............. *H01F 29/04* (2013.01); *G05F 1/14* (2013.01); *H02J 1/04* (2013.01); *H02J 2300/00* (2020.01)

(58) Field of Classification Search
CPC ........ G05F 1/14; H01F 29/04; H02J 2300/00; H02J 1/04
See application file for complete search history.

(56) References Cited

U.S. PATENT DOCUMENTS

| | | | | |
|---|---|---|---|---|
| 6,323,618 B1* | 11/2001 | Kitamura | ............. | H02J 3/1885 |
| | | | | 318/714 |
| 2012/0249278 A1* | 10/2012 | Krok | ................... | H02J 3/1878 |
| | | | | 336/150 |
| 2013/0307494 A1* | 11/2013 | Meinecke | ............ | H02J 3/1878 |
| | | | | 323/205 |
| 2015/0019039 A1* | 1/2015 | Bell | ....................... | G06Q 50/06 |
| | | | | 700/298 |

(Continued)

FOREIGN PATENT DOCUMENTS

| | | |
|---|---|---|
| JP | 2006-042546 A | 2/2006 |
| KR | 10-2004-0014328 A | 2/2004 |
| KR | 10-0920152 B1 | 10/2009 |

(Continued)

*Primary Examiner* — Harry R Behm
(74) *Attorney, Agent, or Firm* — Bridgeway IP Law Group, PLLC; Sang Ho Lee; Hyun Woo Shin

(57) ABSTRACT

Provided is an apparatus and method for improving generation efficiency of a distributed generation facility, and more specifically, to an apparatus and method for improving generation efficiency of a distributed generation facility configured to improve generation efficiency by boosting a voltage within an allowable voltage range according to a linkage capacity when the generated power of the distributed generation facility is linked and supplied to a power transmission and distribution side.

8 Claims, 3 Drawing Sheets

(56) References Cited

U.S. PATENT DOCUMENTS

2019/0267806 A1* 8/2019 Scott .................... H02J 3/18

FOREIGN PATENT DOCUMENTS

| KR | 10-1815464 B1 | 1/2018 |
| KR | 10-2018-0067933 A | 6/2018 |
| KR | 10-2072972 B1 | 2/2020 |
| KR | 10-2192000 B | 12/2020 |
| WO | WO-2016165739 A1 * | 10/2016 |

* cited by examiner

APPARATUS AND METHOD FOR IMPROVING EFFICIENCY OF DISTRIBUTED GENERATION FACILITY

TECHNICAL FIELD

The present invention relates to an apparatus and method for improving generation efficiency of a distributed generation facility, and more specifically, to an apparatus and method for improving generation efficiency of a distributed generation facility configured to improve generation efficiency by boosting a voltage within an allowable voltage range according to a linkage capacity when the generated power of the distributed generation facility is linked and supplied to a power transmission and distribution side.

BACKGROUND ART

Generally, all generation facilities linked to a power system network should be linked without compromising the operational stability of a power system, and the technical requirements for this vary from country to country, but are usually specified in a common grid code (GRID CODE) or on the transmission and distribution service provider side.

Accordingly, when a new generation facility is linked to the power system network, it is necessary to design the new generation facility to be linked to a load without threatening the stability and reliability of the power system network.

Recently, a distributed energy resource (DER) is being supplied as a power generation energy resource which is distributed in a small scale near a power consumption region unlike a large-scale centralized power source, and a design considering a linkage capacity is also necessary in the distributed energy resource.

Typically, as demand for direct supply of direct current (DC) power increases with the advent of DC consumers, the distributed energy resource has been developed centered around DC distribution capable of directly supplying the DC power to consumers.

In order to increase usability of the distributed energy resource, new energy, renewable energy, and private generation facilities are used in a distribution system, and among the above, the new energy includes fuel cells, coal liquefaction gasification, heavy residue gasification, hydrogen energy, and the like.

The renewable energy includes solar power, solar heat, bio, wind power, hydropower, marine, waste, geothermal energy, and the like, and the capacity of a distributed generation facility is calculated so that a distributed generator, a power generation module, or the like using the above renewable energy is linked to the transmission and distribution system.

In this case, since the distributed generator or the like which operates as a distributed generation source can affect a voltage which determines the quality of power transmission and distribution, a size of the transmission voltage is determined in terms of the linkage capacity to provide stabilization of the power system.

However, since the conventional distributed generation facility determines a station voltage according to an operating voltage determined by the transmission and distribution system, and transmits the station voltage to the transmission and distribution system at a fixed voltage according to the determination, there is a problem in that the distributed generation capacity cannot be increased and thus the generation efficiency is low.

PATENT DOCUMENT (Patent Document 1) Korean Registration Patent No. 10-1815464
(Patent Document 2) Korean Registration Patent No. 10-2072972

DISCLOSURE

Technical Problem

The present invention is to solve the above problems and is to provide an apparatus and method for improving generation efficiency of a distributed generation facility configured to improve generation efficiency by boosting a voltage within an allowable voltage range according to a linkage capacity when the generated power of the distributed generation facility is linked and supplied to a power transmission and distribution side.

Technical Solution

To this end, an apparatus for improving generation efficiency of a distributed generation facility according to the present invention includes: a tap changer configured to control a station transformer that supplies power from the distributed generation facility to a power transmission and distribution side; an automatic voltage regulator configured to provide a tap change control signal to the tap changer; a reference value memory configured to record an allowable voltage range that is supplied from the distributed generation facility to the power transmission and distribution side; and a transmission controller configured to provide a set point control signal including a command which boosts the station transformer within the allowable voltage range according to an amount of power generation to the automatic voltage regulator.

In this case, the tap changer may be an on-load tap changer (OLTC) configured to change a tap position while power is supplied to change a turns ratio of the station transformer, and the on-load tap changer may be connected to a secondary side of the station transformer to increase the number of secondary side windings of the station transformer so that boosting may be achieved.

Further, the automatic voltage regulator may be an automatic voltage regulator (AVR) configured to control the on-load tap changer 110 so that the boosted voltage may be maintained within the allowable voltage range.

In addition, the transmission controller may boost the voltage output from the distributed generation facility to the power transmission and distribution side to a maximum voltage within the allowable voltage range.

In addition, the apparatus may include at least one control node configured to control the voltage transmitted from the distributed generation facility to the power transmission and distribution side, and the transmission controller may monitor the voltage detected by the control node to generate a set point control signal within the allowable voltage range.

In addition, the control node may include an inverter and a capacitor connected to an output side of the distributed generation facility, and the transmission controller may control one or more of the inverter and the capacitor so that boosting is achieved within the allowable voltage range.

In addition, the transmission controller may collect real-time measurement data from a control node having a measurement apparatus among the control nodes, may analyze real-time power data using the measurement data collected in real time, may calculate a parameter by applying the real-time analyzed power data to constants of four terminals with the distributed generation facility as an input side and the power transmission and distribution side as an output side, and may calculate a regulation voltage at the control node with the parameter to regulate the control node in real time within the allowable voltage range.

In addition, the transmission controller may configure a load model including at least one or more nodes among the control nodes through a load modeling technique, may calculate a power flow in the load model through a power flow calculation technique, may calculate a parameter at each node constituting the load model using the calculated power flow, and may calculate the regulation voltage at the control node with the parameter to regulate the control node in real time within the allowable voltage range.

Meanwhile, a method of improving generation efficiency of a distributed generation facility according to the present invention includes: an allowable range determining operation of recording an allowable voltage range that is supplied from a distributed generation facility to a power transmission and distribution side in a reference value memory; a boosting command operation of providing a set point control signal including a command which boosts a station transformer within the allowable voltage range according to an amount of power generation by a transmission controller; a change signal providing operation of providing a tap change control signal according to the set point control signal by an automatic voltage regulator; and a boosting adjustment operation of controlling, by a tap changer, so that secondary side windings of a station transformer configured to supply power from the distributed generation facility to the power transmission and distribution side according to the tap change control signal are boosted.

Advantageous Effects

In the present invention, when the generated power of a distributed generation facility is linked and supplied to a transmission and distribution side, a station transmission voltage is controlled to be boosted more than before within an allowable voltage range according to a linkage capacity.

Accordingly, since an amount of final generation output of a distributed generation energy resource is increased in response to a frequently changing voltage of a generation system, generation efficiency in terms of generation is improved, economic efficiency is improved, and power supply reliability is increased by preventing a voltage drop of the system.

MODES OF THE INVENTION

Hereinafter, an apparatus and method for improving generation efficiency of a distributed generation facility according to a preferable embodiment of the present invention will be described in detail with reference to the accompanying drawings.

Figure 1:
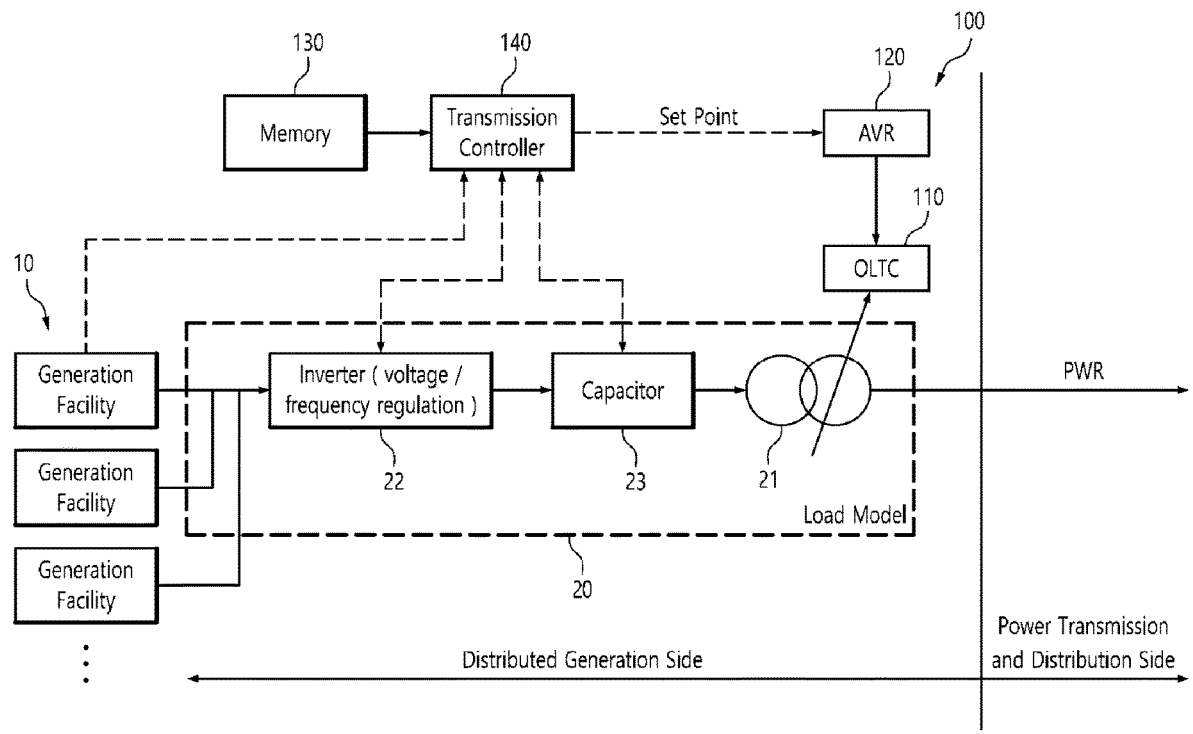
FIG. 1 is a block diagram illustrating an apparatus for improving generation efficiency of a distributed generation facility according to the present invention.

As shown in FIG. 1, the present invention is directed to supply power generated from a distributed generation facility 10 to a power transmission and distribution side, and a transmission voltage is regulated by the control node 20 of a power station so that the distributed generation facility 10 is linked to a power system network of the power transmission and distribution side.

Here, the distributed generation facility 10 is a generation source including a generator, a power generation module, or the like which may be distributed and disposed in a small scale near a power consumption region, and is often referred to as a generator and supplies a distributed energy resource (DER).

Examples of the distributed generation facility 10 include new energy, renewable energy, private generation facilities, and the like. In this case, the new energy includes a fuel cell, coal liquefaction gasification, heavy residue gasification, hydrogen energy, and the like, and the renewable energy includes solar power, solar heat, bio, wind power, hydropower, ocean, waste, geothermal energy, and the like.

The power transmission and distribution side is a power system which supplies power to large-scale and small-scale consumers or power loads such as factories, and the like, and organizers that manage the power transmission and distribution side may vary by country, and the power transmission and distribution side is usually installed and managed by a public institution or a power company (for example, KEPCO).

The control node 20 controls the power generated by the distributed generation facility 10 so that the power is supplied to the power transmission and distribution side, and the control node 20 includes a station transformer 21 which adjusts a voltage to be suitable for a linkage capacity. Further, an inverter 22 and a capacitor 23 may be further included.

In an embodiment, the inverter 22 is installed at an output terminal of the distributed generation facility 10 to adjust the voltage as well as a frequency, and the capacitor adjusts the voltage at the output terminal of the inverter 22 to stabilize a transmission voltage.

The station transformer 21 finally transforms the voltage. This station transformer 21 is a transformer for supplying power to a load in a substation, and may refer to direct connection to a bus, but in the present invention, refers to a transformer for transmitting power to the power transmission and distribution side.

In this system, the distributed generation facility 10 may be composed of a plurality of generation sources, such as a photovoltaic (PV) panel, and the station transformer 21 or inverter 22 may be respectively provided at output terminals of distributed generation facilities 10 or may be commonly connected to a plurality of distributed generation facilities 10. This is also the case for the capacitor 23.

In this distributed generation facility 10, a distributed power generation system linked to the power system network (power transmission and distribution side) through the control node 20 including the station transformer 21, the inverter 22, and the capacitor 23 is configured, and linkage is performed so that operation stability of a power transmission and distribution side power system is not impaired.

Further, a system design of the above-described distributed generation facility 10 and the control node 20 therefor is made so that the connection is made without threatening the stability and reliability of the power system network when the distributed generation facility 10 is linked to the power system network.

Meanwhile, an apparatus for improving generation efficiency 100 of the distributed generation facility according to the present invention includes a tap changer 110, an automatic voltage regulator 120, a reference value memory 130, and a transmission controller 140, and these components interwork with the distributed generation facility 10 of the above-described distributed power generation system and the control node 20 therefor.

In this case, the tap changer 110 adjusts the station transformer 21 which is one of the control nodes 20, and the automatic voltage regulator 120 controls the tap changer 110. The reference value memory 130 records an allowable voltage range of the power transmission and distribution side, and the transmission controller 140 forces the station transformer 21 to be boosted higher than a voltage before a voltage change within the allowable voltage range.

Like the above, in the present invention, when the generated power of the distributed generation facility 10 is linked and supplied to the power transmission and distribution side, a station transmission voltage is controlled to be boosted more than a previous voltage within the allowable voltage range according to the linkage capacity.

In the present invention, boosting control of the station voltage is performed at a time of determination through monitoring, a time of a voltage drop due to a decrease in an amount of power generation of the distributed generation facility 10, and a time of a voltage drop due to an increase in a load, and boosting is achieved within the allowable voltage range.

Accordingly, since an amount of final generation output of the distributed generation energy resource is increased in response to a frequently changing voltage of the generation system, generation efficiency in terms of generation is improved, economic efficiency is improved, and power supply reliability is increased by preventing the voltage drop of the system.

Specifically, the tap changer 110 controls the station transformer 21 which supplies power from the distributed generation facility 10 to the power transmission and distribution side. The station transformer 21 is one of the control nodes 20 and is usually provided at an end portion of a transmission side.

The tap changer 110 applies an on-load tap changer (OLTC) to control the station transformer 21 which is supplying the generated power. The on-load tap changer 110 changes a tap position while power is being supplied to change a turns ratio of the station transformer 21.

Specifically, the on-load tap changer 110 applied to the present invention is connected to a secondary side of the station transformer 21, and increases the number of windings on the secondary side of the station transformer 21 by a tap change so that boosting is made in the station transformer 21. That is, the station transformer 21 is forced to be boosted compared to the previous voltage change state.

A conventional OLTC commonly performs the tap change while installed at a primary side of the transformer so that the voltage is reduced for supply to consumers, but in the present invention, the OLTC is installed at the secondary side of the transformer to increase the number of secondary side windings (the turns ratio).

Further, in the general case, energy is saved by maintaining the voltage level of each node constituting the power system at optimum lower limit within the allowable voltage range through optimization control of the voltage and reactive power using conservation voltage reduction (CVR), but in the present invention, the boosting is done to improve generation efficiency, and the like.

The automatic voltage regulator 120 provides (transmits) a tap change control signal to the tap changer 110, and in the present invention, the tap changer 110 is controlled for the purpose of regulating the voltage transmitted to the power transmission and distribution side of the power generated in the distributed generation facility.

This automatic voltage regulator 120 may preferably be an automatic voltage regulator (AVR) which controls the on-load tap changer 110 so that the voltage within the allowable voltage range stored in the following reference value memory 130 is boosted.

In the embodiment, in the case of a distributed generation facility 10 with a linkage capacity of 500 kW or more of a distributed energy resource such as a solar power plant, a wind power plant, a fuel cell, and the like, linkage should be made at a special high voltage of 22.9 kV according to a distribution system connection technology standard stipulated by the power transmission and distribution side.

Figure 2:
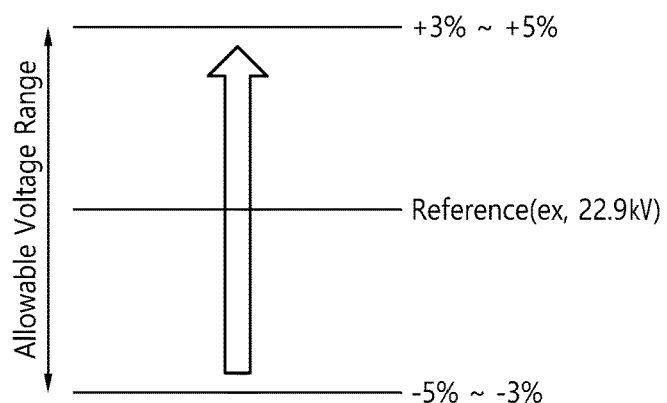
FIG. 2 is an exemplary view illustrating an allowable voltage range of the present invention.

As shown in FIG. 2, since a final generation voltage of the distributed generation facility 10 is approximately 380V to 6,600V, it is necessary to boost the voltage by the station transformer 21 so that the voltage is linked to a special high voltage of 22.9 kV stipulated by the power transmission and distribution side.

In this case, like a case stipulated by the power transmission and distribution side, since 3% to 5% of a surplus is recognized based on 22.9 kV when linked to the system, the automatic voltage regulator 120 may transmit the generation energy resource to the power transmission and distribution side within an allowable voltage range of 22.9 kV±3% to 5%.

The reference value memory 130 records the allowable voltage range which may be supplied from the distributed generation facility 10 to the power transmission and distribution side, and records a range of the allowable voltage stipulated during system network linkage as described above.

Here, since Korea Electric Power Corp™, which is a power provider that manages transmission and distribution systems in Korea, is described as an example, the generation energy resource is transmitted within the voltage range of 22.9 kV±3% to 5%, and accordingly, the allowable voltage range is provided.

However, since the boosting for system linkage may be different for each country or region, and may also vary depending on the power transmission and distribution side linkage capacity or the linkage capacity according to the distributed generation facility 10, the reference value memory 130 records the allowable voltage range accordingly.

The transmission controller 140 provides a set point control signal to the automatic voltage regulator 120 according to the amount of power generation by the distributed generation facility, and the set point control signal includes a command for boosting the station transformer 21 within the allowable voltage range.

The set point control signal controlled by the transmission controller 140 is used for boosting for linkage of the generation energy resource and the power transmission and distribution side, but in the present invention, the purpose of the present invention is to increase the transmission voltage which is already within the allowable range to a higher level than before.

Since the voltage within the allowable range is forcibly boosted as the generation power within the allowable range is increased further than before, the voltage drop according to the load is prevented and the maximum output is provided, and thus the maximum efficiency of generation is provided.

For this reason, the transmission controller 140 may boost the voltage output from the distributed generation facility 10 to the power transmission and distribution side to the maximum value stipulated according to the system linkage. That is, the voltage output from the distributed generation facility 10 is controlled to become the maximum value within the allowable voltage range.

Meanwhile, in the present invention, since the control node 20 is controlled according to the amount of power generation changed in real time in the distributed generation facility 10, it is possible to set a boosting condition within an optimal allowable range which may be provided by the amount of power generation.

Accordingly, the present invention includes at least one control node 20 which controls the voltage transmitted from the distributed generation facility 10 to the power transmission and distribution side. This control node 20 may include the inverter 22 and the capacitor 23 as well as the station transformer 21.

Since the inverter 22 and the capacitor 23 are sequentially connected to the secondary side of the station transformer 21, the voltage is adjusted at each node, and the tap changer 110 of the station transformer 21 as well as other control nodes 20 are controlled to enable the boosting according to an amount of real-time generation.

Accordingly, the transmission controller 140 of the present invention may monitor the voltage detected by the control node 20 to generate the set point control signal within the allowable voltage range according to the monitoring result.

Specifically, when the control node 20 includes the inverter 22 and the capacitor 23, at least one of the inverter 22 and the capacitor 23 may be controlled so that the boosting may be achieved within the allowable voltage range.

For example, when the distributed generation facility 10 is a solar PV panel and the amount of power generation is reduced due to a change in weather or altitude of the sun, the voltage of the inverter 22 is lowered. Accordingly, when a voltage decrease is detected as the monitoring result of the inverter 22, the transmission controller 140 controls the inverter 22 so that the boosting is done in the inverter 22.

Like the above, in the present invention, the control node 20 is controlled so that the boosting compared to the current transmission voltage or the current secondary side voltage of the station transformer 21 is achieved with reference to the allowable voltage range in the transmission controller 140.

In this case, the transmission controller 140 of the present invention monitors the voltage at each of the control nodes 20 in real time through monitoring of the control node 20, and through this, a method of further improving the voltage control efficiency is provided.

To this end, the transmission controller 140 extracts the voltage for each of the control nodes 20. The voltage of the control node 20 refers to an input terminal voltage and/or output terminal voltage of each node, which is classified into a node equipped with a measurement apparatus and a node not provided with the measurement apparatus.

When there is the measurement apparatus in the control node 20 for voltage control, and thus the voltage at the corresponding control node 20 may be directly measured, the transmission controller 140 collects real-time measurement data in the control node 20 having the measurement apparatus among the control nodes 20.

Further, real-time power data is analyzed using the measurement data collected in real time, and a parameter is calculated by applying the real-time analyzed power data to constants of four terminals.

Figure 3:
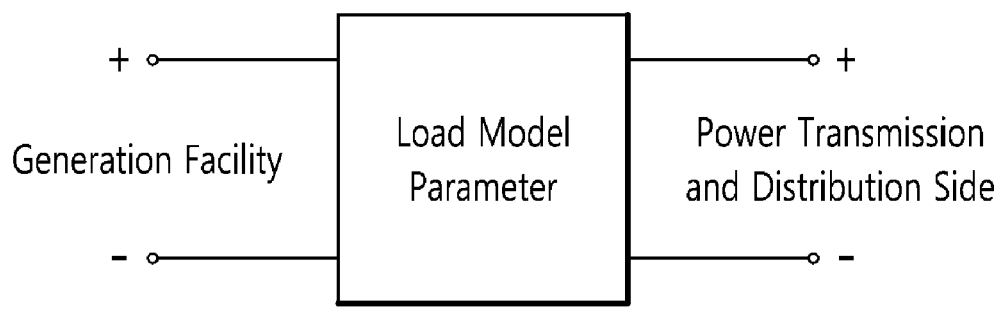
FIG. 3 is a view illustrating a four-terminal network load model of the present invention.

In this case, as shown in FIG. 3, the constants of four terminals use the distributed generation facility 10 as an input side and the power transmission and distribution side as an output side, and the parameter includes a voltage, a current, impedance, reactive power, a power factor, and the like.

Accordingly, the control node 20 is regulated within the allowable voltage range in real time by calculating a regulation voltage at the control node 20 with a parameter. That is, the control node 20 is controlled so that the boosting is achieved in a regulatory voltage range confirmed through the parameter.

As a method of calculating the voltage of the power system using the parameter, various methods may be applied. For example, one among the Newton-Raphson method, the adaptive Newton-Raphson method, the Fast-Decoupled method, and the Accelerated Gauss-Seidel method may be used. Accordingly, the voltage is regulated within the allowable voltage range based on the calculated voltage.

On the other hand, in the case of a control node 20 not having the measurement apparatus among the control nodes 20, the transmission controller 140 configures a load model including at least one node among the control nodes 20 through a load modeling technique.

A ZIP model or a complex (static and dynamic) load model may be used as a load modeling of the control node 20 used in voltage regulation, and then a power flow in the load model is calculated through a power flow calculation technique.

The Newton-Raphson method, the adaptive Newton-Raphson method, the Fast-Decoupled method, the Accelerated Gauss-Seidel method, and the like as well as the constants of four terminals may be used for power flow calculation.

Figure 4:
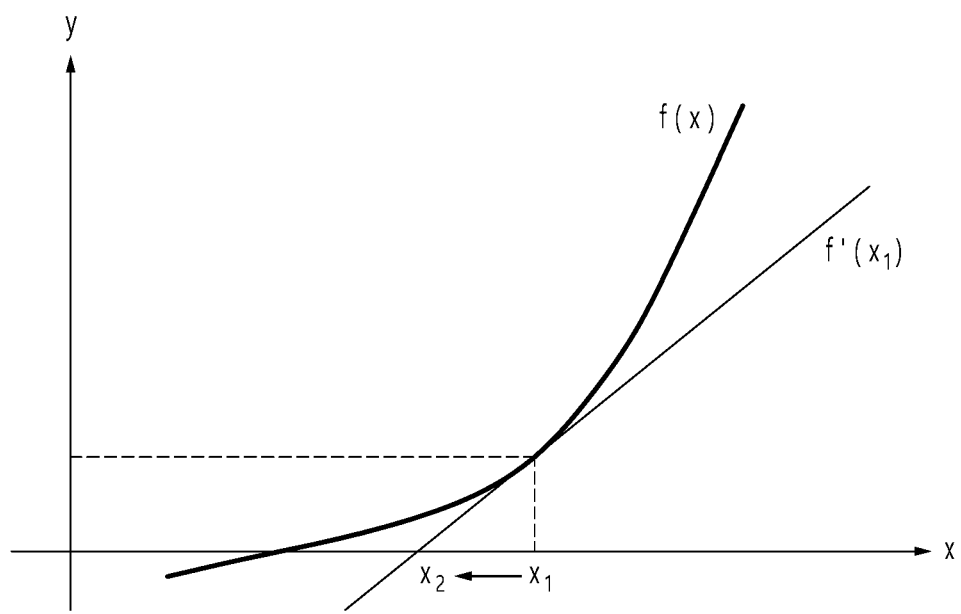
FIG. 4 is a view illustrating the Newton-Raphson method applied to the present invention.

For example, as shown in FIG. 4, the parameter such as a voltage or the like may be calculated when approximate values of the calculated voltages are within an error range by adjusting the input voltage little by little through the Newton-Rabson method.

As shown in the drawings, the Newton-Rapson method is a method of gradually finding a solution while drawing a tangent from a current x value and using the x as a point where the tangent meets an x-axis.

Accordingly, when the Newton-Rapson method is formulated, an approximate value is found by continuously moving the x from an arbitrary value or initial value x1 until convergence according to the following <Equation>, and a termination condition is until there is little change in the value of the x.

That is, when a value |xt+1−xt| is very small, the Newton-Rapson method is terminated and it is determined that x=xt+1 is a solution, that is, f(xt+1)=0.

$$x^{t+1} = x^t - \frac{f(x^t)}{f'(x^t)} \qquad \text{\langle Equation\rangle}$$

Further, in the present invention, the parameter at each node constituting the load model is calculated using the power flow calculated as above. As described above, the calculated parameter includes the voltage, the current, the impedance, the power factor, the reactive power, and the like.

Accordingly, the control node 20 is regulated within the allowable voltage range in real time by calculating the regulation voltage at the control node 20 with the parameter. That is, the control node 20 is controlled so that the boosting is achieved in the regulatory voltage range confirmed through the parameter.

Preferably, the transmission controller 140 respectively estimates the voltages in the control node 20 having the measurement apparatus and the control node 20 not having the measurement apparatus by the above-described methods to reflect all the nodes, and then the final output voltage is regulated to be boosted within the allowable voltage range by controlling all the control nodes 20 in an optimal state.

Like the above, the transmission controller 140 of the present invention analyzes the power system using the constants of four terminals based on a real-time load model configuration of the distributed energy resource.

Further, the voltage, the current, the reactive power, the power factor, and the like of the transmission and distribution system and a station system of the distributed energy resource are calculated to calculate the voltage for achieving the amount of power generation of the maximum efficiency in real time.

Accordingly, based on real-time calculated information, the voltage is regulated by setting control points in the automatic voltage regulator 120, the inverter 22, the capacitor 23, and the like.

Further, the transmission controller 140 regulates a final output voltage of the distributed energy resource to a voltage higher than the existing voltage in real time according to a voltage change of the distributed energy resource station system and the transmission and distribution system linked thereto, in consideration of stability calculated within the allowable voltage range in real time.

Accordingly, energy efficiency is improved by increasing an amount of final generation output of the distributed energy resource in response to a frequently changing voltage of the system, and the expansion and dissemination of the distributed energy resource may be enabled by increasing economic feasibility of the distributed energy resource.

Further, the voltage is regulated to be higher than the existing voltage to cope with the frequently changing voltage of the system and the reliability of the system may be increased by reducing the voltage drop of the distributed energy resource system and the transmission and distribution system.

That is, energy efficiency improvement may be maximized by securing the system stability and increasing the amount of power generation of the distributed energy resource through real-time load model-based voltage reactive power optimization control of the distributed energy resource.

Hereinafter, a method of improving generation efficiency of the distributed generation facility according to the present invention will be described with reference to the accompanying drawings.

However, an example in which the method of improving generation efficiency of the distributed generation facility which will be described below is realized by the apparatus of the present invention will be described. Accordingly, hereinafter, redundant descriptions are omitted as much as possible.

Figure 5:
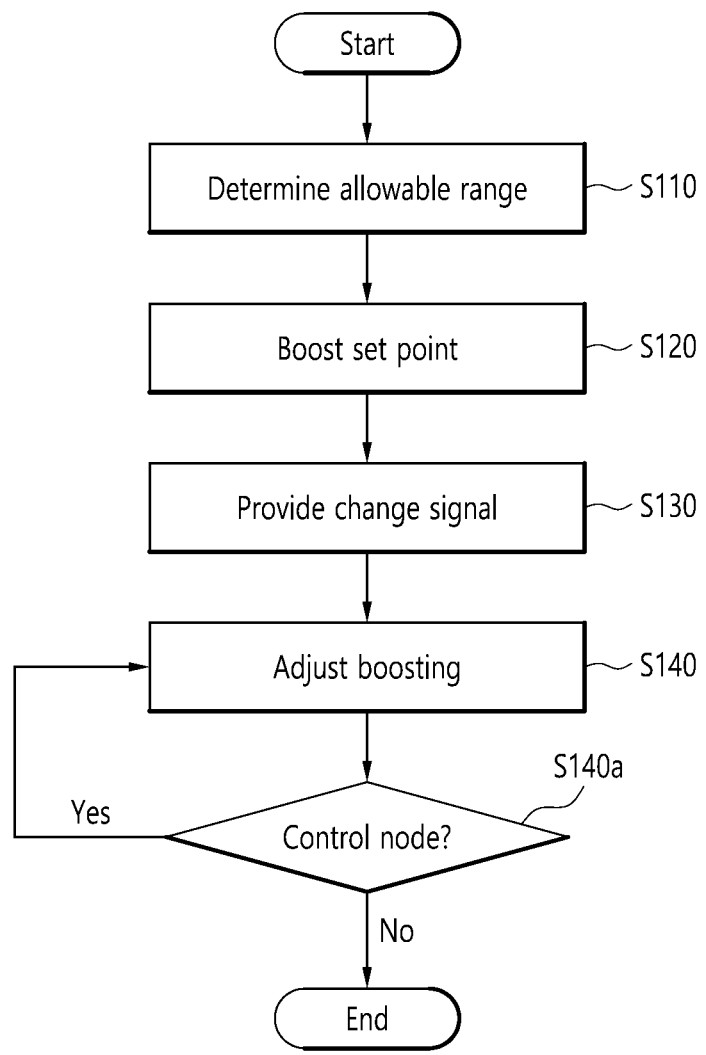
FIG. 5 is a flow chart illustrating a method of improving generation efficiency of the distributed generation facility according to the present invention.

As shown in FIG. 5, the method of improving generation efficiency of the distributed generation facility according to the present invention includes an allowable range determining operation (S110), a boosting command operation (S120), a change signal providing operation (S130), and a boosting adjustment operation (S140).

The present invention is directed to supply power generated from the distributed generation facility 10 to the power transmission and distribution side, and the transmission voltage is regulated by the control node 20 of the power station so that the distributed generation facility 10 is linked to the power system network of the power transmission and distribution side.

The distributed generation facility 10 is a generation source including a generator, a power generation module, or the like which may be distributed and disposed in the small scale near the power consumption region, and includes the new energy, renewable energy, and private generation facilities.

The control node 20 controls so that the power generated by the distributed generation facility 10 is supplied to the power transmission and distribution side, and the control node 20 may include the station transformer 21 which adjusts the voltage according to the linkage capacity, the inverter 22, and the capacitor 23.

In the embodiment, the inverter 22 is installed at the output terminal of the distributed generation facility 10 to adjust the voltage as well as the frequency, the capacitor adjusts the voltage at the output terminal of the inverter 22 to stabilize the transmission voltage, and the station transformer 21 finally transforms the voltage In this system, the distributed generation facility 10 may be composed of a plurality of generation sources, and the station transformer 21 or the inverter 22 may be respectively provided at output terminals of distributed generation facilities 10 or may be commonly connected to the plurality of distributed generation facilities 10. This is also the case for the capacitor 23.

In this case, in the above-described allowable range determining operation (S110), the allowable voltage range which may be supplied from the distributed generation facility 10 to the power transmission and distribution side is recorded in the reference value memory 130. That is, the stipulated allowable voltage range during the system linkage is recorded.

In the embodiment, in the case of the distributed generation facility 10 with a linkage capacity of 500 kW or more of a distributed energy resource such as a solar power plant, a wind power plant, a fuel cell, and the like, the linkage should be made at a special high voltage of 22.9 kV according to the distribution system connection technology standard stipulated by the power transmission and distribution side.

Since the final generation voltage of the distributed generation facility 10 is approximately 380V to 6,600V, it is necessary to boost the voltage by the station transformer 21 so that the voltage is linked to the special high voltage of 22.9 kV stipulated by the power transmission and distribution side.

In this case, like the case stipulated by the power transmission and distribution side, since 3% to 5% of a surplus is recognized based on 22.9 kV when linked to the system, an allowable voltage range of 22.9 kV±3% to 5% is recorded in the reference value memory 130.

Next, in the boosting command operation (S120), the allowable voltage range is read with reference to the reference value memory 130, and a set point control signal including a command which boosts the station transformer 21 within the allowable voltage range according to the amount of power generation is provided.

The set point control signal controlled by the transmission controller 140 is used for boosting for linkage of the generation energy resource and the power transmission and distribution side, but in the present invention, the purpose of the present invention is to increase the transmission voltage, which is already within the allowable range, to a higher level than before.

Since the voltage within the allowable range is forcibly increased as the generation power within the allowable range is increased further than before, the voltage drop according to the load is prevented and the maximum output is provided, and thus the maximum efficiency of generation is provided.

For this reason, the transmission controller 140 may boost the voltage output from the distributed generation facility 10 to the power transmission and distribution side to the maximum value stipulated according to the system linkage. That is, the voltage output from the distributed generation facility 10 may be controlled to become the maximum value within the allowable voltage range.

Next, in the change signal providing operation (S130), the automatic voltage regulator 120 provides a tap change control signal according to the set point transmitted from the transmission controller 140. The provided tap change control signal is a boosting control signal of the tap changer 110.

An automatic voltage regulator (AVR) which controls the on-load tap changer 110 so that the voltage within the allowable voltage range stored in the following reference value memory 130 is boosted may be applied as the automatic voltage regulator 120.

In the embodiment, like the case stipulated by the power transmission and distribution side, since 3% to 5% of a surplus is recognized based on 22.9 kV when linked to the system, the automatic voltage regulator 120 may transmit the generation energy resource to the power transmission and distribution side within an allowable voltage range of 22.9 kV±3% to 5%.

Next, in the boosting adjustment operation (S140), the tap changer (110) controls so that secondary side windings of the station transformer 21 configured to supply the power from the distributed generation facility 10 to the power transmission and distribution side are boosted. The boosting is achieved as the tap changer 110 changes the number of windings of the station transformer 21 according to the tap change control signal.

As the tap changer 110, an on-load tap changer 110 is applied to control the station transformer 21 which is supplying the generated power. The on-load tap changer 110 changes a tap position while power is being supplied to change the turns ratio of the station transformer 21.

Specifically, the on-load tap changer 110 applied to the present invention is connected to a secondary side of the station transformer 21, and increases the number of secondary side windings of the station transformer 21 by a tap change so that boosting is achieved in the station transformer 21.

The conventional OLTC commonly performs the tap change while installed at the primary side of the transformer so that the voltage is reduced for supply to consumers, but in the present invention, the OLTC is installed at the secondary side of the transformer to increase the number of secondary side windings (the turns ratio).

Further, in the general case, energy is saved by maintaining the voltage level of each node constituting the power system at the optimum lower limit within the allowable voltage range through optimization control of the voltage and reactive power using the CVR, but in the present invention, the boosting is done to improve generation efficiency, and the like.

Meanwhile, the present invention further includes a node control operation (S140a) of controlling the control node 20 except for the station transformer 21 according to the amount of power generation changed in real time in the distributed generation facility 10, and thus it is possible to set a boosting condition within an optimal allowable range which may be provided by the amount of power generation.

Accordingly, the present invention includes at least one control node 20 which controls the voltage transmitted from the distributed generation facility 10 to the power transmission and distribution side, and the control node 20 may include the inverter 22 and the capacitor 23 as well as the station transformer 21.

Since the inverter 22 and the capacitor 23 are sequentially connected to the secondary side of the station transformer 21, the voltage is adjusted at each node, and the tap changer 110 of the station transformer 21 as well as other control nodes 20 are controlled to enable the boosting according to an amount of real-time generation.

Accordingly, the transmission controller 140 of the present invention may monitor the voltage detected by the control node 20 to generate the set point control signal within the allowable voltage range according to the monitoring result.

Specifically, when the control node 20 includes the inverter 22 and the capacitor 23, at least one of the inverter 22 and the capacitor 23 may be controlled so that the boosting may be achieved within the allowable voltage range.

For example, when the distributed generation facility 10 is a solar PV panel and the amount of power generation is reduced due to the change in weather or altitude of the sun, the voltage of the inverter 22 is lowered. Accordingly, when a voltage decrease is detected as the monitoring result of the inverter 22, the transmission controller 140 controls the inverter 22 so that the boosting is done in the inverter 22.

Like the above, in the present invention, the control node 20 is controlled so that the boosting compared to the current transmission voltage is achieved with reference to the allowable voltage range in the transmission controller 140.

In this case, the transmission controller 140 of the present invention monitors the voltage at each of the control nodes 20 in real time through the monitoring of the control node 20, and through this, a method of further improving the voltage control efficiency is provided.

To this end, the transmission controller 140 extracts the voltage for each of the control nodes 20. The voltage of the control node 20 refers to the input terminal voltage and/or output terminal voltage of each node, which is classified into the node equipped with the measurement apparatus and the node not provided with the measurement apparatus.

When there is the measurement apparatus in the control node 20 for the voltage control, and thus the voltage at the corresponding control node 20 may be directly measured, the transmission controller 140 collects the real-time measurement data in the control node 20 having the measurement apparatus among the control nodes 20.

Further, the real-time power data is analyzed using the measurement data collected in real time, and a parameter is calculated by applying the real-time analyzed power data to the constants of four terminals.

In this case, the constants of four terminals use the distributed generation facility 10 as an input side and the power transmission and distribution side as an output side, and the parameter includes a voltage, a current, impedance, reactive power, a power factor, and the like.

Accordingly, the control node 20 is regulated within the allowable voltage range in real time by calculating the regulation voltage at the control node 20 with a parameter. That is, the control node 20 is controlled so that the boosting is achieved in the regulatory voltage range confirmed through the parameter.

As a method of calculating the regulation voltage of the power system using the parameter, various methods may be applied. For example, one among the Newton-Raphson method, the adaptive Newton-Raphson method, the Fast-Decoupled method, and the Accelerated Gauss-Seidel method may be used.

On the other hand, in the case of the control node 20 not having the measurement apparatus among the control nodes 20, the transmission controller 140 configures a load model including at least one node among the control nodes 20 through a load modeling technique.

A ZIP model or a complex (static and dynamic) load model may be used as a load modeling of the control node 20 used in the voltage regulation, and then a power flow in the load model is calculated through a power flow calculation technique.

The Newton-Raphson method, the adaptive Newton-Raphson method, the Fast-Decoupled method, the Accelerated Gauss-Seidel method, and the like as well as the constants of four terminals may be used for power flow calculation.

Further, the parameter at each node constituting the load model is calculated using the calculated power flow. As described above, the calculated parameter includes the voltage, the current, the impedance, the power factor, the reactive power, and the like.

Accordingly, the control node 20 is regulated within the allowable voltage range in real time by calculating the regulation voltage at the control node 20 with the parameter. That is, the control node 20 is controlled so that the boosting is achieved in the regulatory voltage range confirmed through the parameter.

Preferably, the transmission controller 140 respectively estimates the voltages in the control node 20 having the measurement apparatus and the control node 20 not having the measurement apparatus by the above-described methods to reflect all the nodes, and then the final output voltage is regulated to be boosted within the allowable voltage range by controlling all the control nodes 20 in the optimal state.

In the above, specific embodiments of the present invention have been described above. However, the spirit and the scope of the present invention are not limited to these specific embodiments, and those skilled in the art may understand that various changes and modifications are possible within the scope which does not change the principle of the present invention.

Accordingly, since the above-described embodiments are provided to completely convey the scope of the invention to those skilled in the art, it should be understood as being exemplary and not limiting, and the present invention is only defined by the scope of the claims.

REFERENCE NUMERALS

10: distributed generation facility (generator)
20: control node
21: station transformer
22: inverter
23: capacitor
110: tap changer (OLTC)
120: automatic voltage regulator (AVR)
130: reference value memory
140: transmission controller

The invention claimed is:

1. An apparatus for improving generation efficiency of a distributed generation facility, the apparatus comprising:
a tap changer configured to control a station transformer that supplies power from the distributed generation facility to a power transmission and distribution side;
an automatic voltage regulator configured to provide a tap change control signal to the tap changer;
a reference value memory configured to record an allowable voltage range that is supplied from the distributed generation facility to the power transmission and distribution side; and
a transmission controller configured to provide a set point control signal to the automatic voltage regulator, wherein the set point control signal comprises a command which boosts the station transformer compared to before transformation within the allowable voltage range according to an amount of power generation,
wherein the transmission controller boosts a voltage outputted from the distributed generation facility to the power transmission and distribution side to a maximum voltage within the allowable voltage range.

2. The apparatus of claim 1, wherein:
the tap changer is an on-load tap changer (OLTC) configured to change a tap position while the power is supplied to change a turns ratio of the station transformer; and
the on-load tap changer is connected to a secondary side of the station transformer, and increases a number of windings for the secondary side of the station transformer so that boosting is achieved.

3. The apparatus of claim 2, wherein the automatic voltage regulator controls the on-load tap changer so that the boosted voltage is maintained within the allowable voltage range.

4. The apparatus of claim 1, further comprising at least one control node configured to detect and control the voltage transmitted from the distributed generation facility to the power transmission and distribution side,
wherein the transmission controller monitors the voltage detected by the at least one control node to generate the set point control signal within the allowable voltage range.

5. The apparatus of claim 4, wherein:
the at least one control node comprises an inverter and a capacitor connected to an output side of the distributed generation facility; and
the transmission controller controls one or more of the inverter and the capacitor so that the boosting is achieved within the allowable voltage range.

6. The apparatus of claim 4, wherein the transmission controller collects in real-time measurement data from one of the at least one control node having a measurement apparatus, analyzes in real-time power data using the measurement data collected in real time, calculates a parameter by applying the real-time analyzed power data to a model of four terminals with the distributed generation facility as an input side and the power transmission and distribution side as an output side, and calculates a regulation voltage at the control node with the parameter to regulate the control node in real time within the allowable voltage range.

7. The apparatus of claim 4, wherein the transmission controller constitutes a load model including the at least one control node through a load modeling technique, calculates a power flow in the load model through a power flow calculation technique, calculates a parameter at each node constituting the load model using the calculated power flow, and calculates a regulation voltage at the at least one control node with the parameter to regulate the at least one control node in real time within the allowable voltage range.

8. A method of improving generation efficiency of a distributed generation facility, the method comprising:

recording in a reference value memory an allowable voltage range that is supplied from the distributed generation facility to a power transmission and distribution side;

providing, by a transmission controller, a set point control signal comprising a command which boosts a station transformer within the allowable voltage range according to an amount of power generation;

providing, by an automatic voltage regulator, a tap change control signal according to the set point control signal; and controlling, by a tap changer, so that secondary side windings of the station transformer configured to supply power from the distributed generation facility to the power transmission and distribution side are boosted according to the tap change control signal, wherein the transmission controller boosts a voltage outputted from the distributed generation facility to the power transmission and distribution side to a maximum voltage within the allowable voltage range.

* * * * *